United States Patent
Khorashadi et al.

(10) Patent No.: US 9,164,844 B2
(45) Date of Patent: Oct. 20, 2015

(54) METHOD AND APPARATUS FOR DETECTING ANOMALIES WITHIN INDOOR INFORMATION

(71) Applicant: QUALCOMM Incorporated, San Diego, CA (US)

(72) Inventors: Behrooz Khorashadi, Mountain View, CA (US); Saumitra Mohan Das, Santa Clara, CA (US); Vinay Sridhara, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 318 days.

(21) Appl. No.: 13/797,916

(22) Filed: Mar. 12, 2013

(65) Prior Publication Data

US 2014/0281698 A1    Sep. 18, 2014

(51) Int. Cl.
G08G 1/123     (2006.01)
G01S 19/42     (2010.01)
G06F 11/14     (2006.01)
G09B 29/00     (2006.01)

(52) U.S. Cl.
CPC .......... *G06F 11/1412* (2013.01); *G09B 29/005* (2013.01)

(58) Field of Classification Search
USPC .................................. 701/532; 342/357.25
See application file for complete search history.

(56) References Cited

U.S. PATENT DOCUMENTS

| | | | |
|---|---|---|---|
| 2009/0043504 A1* | 2/2009 | Bandyopadhyay et al. | 701/213 |
| 2009/0102711 A1* | 4/2009 | Elwell et al. | 342/357.06 |
| 2009/0322603 A1* | 12/2009 | Liao | 342/357.12 |
| 2010/0299065 A1 | 11/2010 | Mays | |
| 2011/0309976 A1* | 12/2011 | Leclercq et al. | 342/357.25 |
| 2012/0029817 A1 | 2/2012 | Khorashadi et al. | |
| 2012/0130762 A1 | 5/2012 | Gale et al. | |
| 2012/0203453 A1 | 8/2012 | Lundquist et al. | |
| 2012/0213443 A1 | 8/2012 | Shin et al. | |
| 2012/0310529 A1* | 12/2012 | Hamilton et al. | 701/433 |
| 2013/0166198 A1* | 6/2013 | Funk et al. | 701/446 |

OTHER PUBLICATIONS

International Search Report and Written Opinion—PCT/US2014/024591—ISA/EPO—Jun. 20, 2014.

* cited by examiner

*Primary Examiner* — Thomas G Black
*Assistant Examiner* — Tyler Paige
(74) *Attorney, Agent, or Firm* — Kilpatrick Townsend & Stockton LLP

(57) ABSTRACT

Methods, systems, computer-readable media, and apparatuses for detection of anomalies within indoor map information are presented. In some embodiments, the method includes receiving a digital map. The method may further include identifying one or more anomalies within the digital map using a software-based anomaly detection tool. The method may also include displaying one or more suggested corrections to a user based on the one or more identified anomalies. The method may additionally include correcting the one or more identified anomalies within the digital map.

22 Claims, 10 Drawing Sheets

METHOD AND APPARATUS FOR DETECTING ANOMALIES WITHIN INDOOR INFORMATION

BACKGROUND

Aspects of the disclosure relate to error detection in mapping information for location based services.

Location-based services have become quite popular recently and are used in contexts such as health, entertainment, work, personal life, etc. Indoor location services, a subset of location-based services, provide mapping and directional services indoors, e.g., within a structure. Indoor location services typically require accurate map information about the structure in order to provide reliable mapping and directional services. For example, accurate map information may be required in order for indoor applications be deployed correctly. Often times, the map information is provided by the developer of the indoor application.

However, currently, in many cases the map information provided may be less than correct or insufficient to correctly enable the indoor location services.

BRIEF SUMMARY

These problems and others may be solved according to various embodiments, described herein. Methods, systems, computer-readable media, and apparatuses are described that allow for detection of anomalies within indoor map information.

In some embodiments, a method includes receiving a digital map. The method may further include identifying one or more anomalies within the digital map using a software-based anomaly detection tool. The method may also include displaying one or more suggested corrections to a user based on the one or more identified anomalies. The method may additionally include correcting the one or more identified anomalies within the digital map.

In some embodiments, the method further includes generating assistance data based on the correcting.

In some embodiments, the method further includes appending the assistance data to the digital map.

In some embodiments, the software-based anomaly detection tool identifies the one or more anomalies within the digital map based on detection of one or more points where an indoor area of the digital map leads to an outdoor area of the digital map.

In some embodiments, the software-based anomaly detection tool identifies the one or more anomalies within the digital map based on one or more unreachable areas within an indoor area of the digital map.

In some embodiments, the software-based anomaly detection tool identifies the one or more anomalies within the digital map based on overlaying an indoor map of the digital map over an outdoor map of the digital map.

In some embodiments, the software-based anomaly detection tool identifies the one or more anomalies within the digital map based on using a database of known shapes and using shape matching algorithms to verify correct labeling of the known shapes in the digital map.

In some embodiments, the software-based anomaly detection tool identifies the one or more anomalies within the digital map based on locating incorrect placement of one or more access points within the digital map.

In some embodiments, the digital map is configured for use with an application on a mobile device.

In some embodiments, an apparatus includes a processor and a memory. The memory may include a software development kit (SDK) configured to receive a digital map. The SDK may further be configured to identify one or more anomalies within the digital map using a software-based anomaly detection tool. The SDK may also be configured to display one or more suggested corrections to a user based on the one or more identified anomalies. The SDK may additionally be configured to correct the one or more identified anomalies within the digital map.

In some embodiments, an apparatus includes means for receiving a digital map. The apparatus may further include means for identifying one or more anomalies within the digital map using a software-based anomaly detection tool. The apparatus may also include means for displaying one or more suggested corrections to a user based on the one or more identified anomalies. The apparatus may additionally include means for correcting the one or more identified anomalies within the digital map.

In some embodiments, a computer program product residing on a processor-readable medium and comprising processor-readable instructions is configured to cause a processor to receive a digital map. The instructions may be further configured to cause the processor to identify one or more anomalies within the digital map using a software-based anomaly detection tool. The instructions may also be configured to cause the processor to display one or more suggested corrections to a user based on the one or more identified anomalies. The instructions may additionally be configured to cause the processor to correct the one or more identified anomalies within the digital map.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. In the accompanying figures, like reference numbers indicate similar elements, and.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Aspects of the disclosure provide more convenient, intuitive, and functional ways of detecting anomalies within indoor map information.

A software-based anomaly detection tool may be configured to allow application (app) developers of an indoor application to upload map information. The tool may analyze the map information and detect anomalies within the map information (e.g., missing features, unreachable areas, scaling issues, layer issues, and access point placement). The tool may take the application developer through each analysis step and provide recommendations and suggested corrections to the anomalies found within the map information.

Indoor location services may rely heavily on the map information. These maps may provide the basis for data input to positioning engines and a host of other location based services. As a result, flaws and anomalies in the map information may greatly affect the positioning engine and also a user's experience with the indoor application (e.g., failed routes within the structure). Once the anomalies are identified, the software-based anomaly detection tool may suggest corrections to the application developer or allow the application developer to self-correct.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1A:
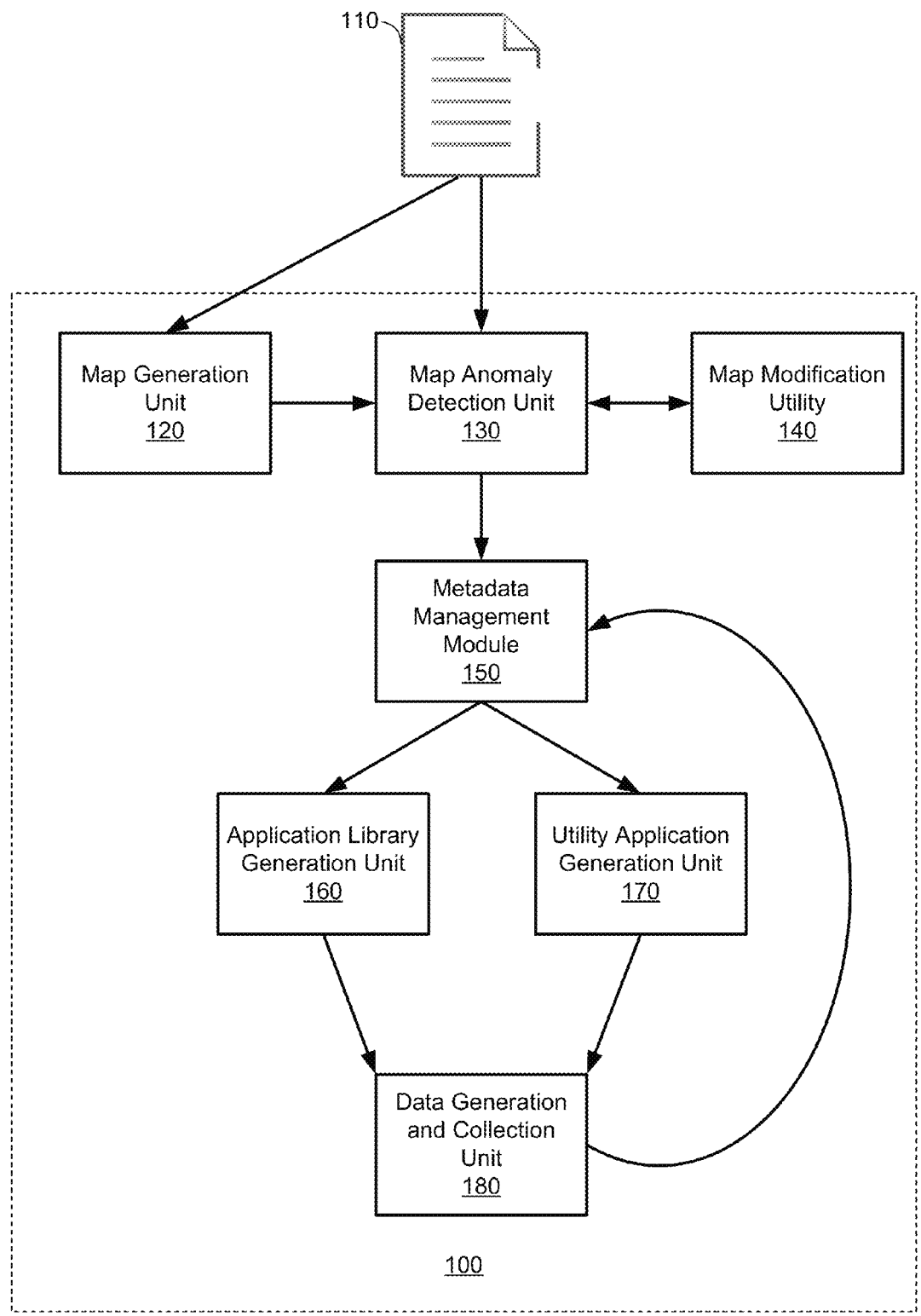
FIG. 1A illustrates a simplified block diagram of a system in accordance with some embodiments.

FIG. 1A illustrates a simplified flow diagram of a system 100 that may incorporate one or more embodiments. System 100 is configured to enable an application developer and/or an owner of a structure (collectively referenced to as a user) to self-deploy indoor location applications which will work in conjunction with a positioning engine (not shown). In some embodiments, system 100 may be referred to as an indoor location development kit (IDK). An application developer and/or an owner of a structure may use the system 100 to generate a map. The maps may be analyzed and processed to produce an admin/debug application and an indoor location library framework, which may assist the user in deploying the indoor application. Various data may be collected by the system 100 to regenerate improved maps in subsequent uses of the system 100 by the user. In some embodiments, system 100 may include an integrated user interface (not shown) for purposes of allowing feedback to the user during the analysis and processing functions.

System 100 includes map generation unit 120, map anomaly detection unit 130, map modification utility 140, metadata management module 150, application library generation unit 160, utility application generation unit 170, and data generation and collection unit 180. In some embodiments, digital map data 110 may be input into system 100.

Most indoor location services require map information defining the inside of the structure to be effectively used with an indoor application. A user may provide digital map data 110 to the map generation unit 120. The map generation unit 120 is configured to generate a map of the structure based on the digital map data 110 provided by the user. In some embodiments, the system 100 may provide analysis of the digital map data 110 to generate/transform low-quality digital map data 110 into high-quality digital map data 110 appropriate for use with an indoor location application. In some embodiments, the user may directly provide the digital map data to the map anomaly detection unit 130 if the digital map data 110 is already in an acceptable format for the system 100.

The map anomaly detection unit 130 is configured to analyze the map generated by the map generation unit 120. The map anomaly detection unit 130 may identify any map flaws or anomalies that may inhibit the indoor location application from functioning properly. In some embodiments, the map anomaly detection unit 130 receives digital map data 110 directly from the user and analyzes the data accordingly. The map anomaly detection unit 130 may be considered to be a software-based anomaly detection unit.

The map modification utility 140 is configured to allow a user to modify the map for use with the indoor location application. Since the digital map data 110 provided by the user may be flawed, the map modification utility 140 provides an extensive user interface allowing for changes to the map data enabling fixes to components of the digital map data 110 that enable the indoor application. The modification may be done intelligently. That is, the map modification utility 140 may provide the user with hints or shortcuts extracted from the analysis of the digital map data 110 performed by the map anomaly detection unit presenting map flaws or anomalies that may be corrected by the user. Upon making modifications to the map, if any, the map modification utility may forward the map information back to the map anomaly detection unit 130 for further analysis or system 100 may continue the map generation process. It can be appreciated that the map modification utility 140 may be bypassed if no potential map modifications need to be presented to the user. The map modification utility 140 map receive map data from the map anomaly detection unit 130.

In some embodiments, the map modification utility 140 may allow the user to perform common tasks to modify indoor location specific functions. For example, the user may perform a swipe gesture to add a door to the digital map data 110.

The metadata management module 150 is configured to add additional metadata to the map. Often times, a simple map of the structure may not be sufficient to fully enable the user's vision for the indoor application. In many cases, the user may desire to add additional metadata to the map for purposes of enabling advanced features for the indoor application. The metadata management module 150 allows the user to augment the map with metadata regarding characteristics of the structure. Some examples of metadata include, but are not limited to, points of interest (POI), structure material information, lighting information, etc.

As an example, structure material information may provide assistance in generating positioning data used to achieve an indoor position or may provide assistance in building an efficient wireless local area network (Wi-Fi) model. As another example, lighting information may assist the positioning engine in identifying well-lit areas of the structure at night. As yet another example, POI information may allow a store owner to add shopping item location information to the map. A further example may include restricted zone information allowing the structure owner to designate restricted areas of the map where end-users may be prohibited from entering. The metadata management module 150 may receive map data from the map anomaly detection unit 130.

The application library generation unit 160 is configured to generate a range of applications enabling components from a fully developed application to a basic set of libraries which the user may leverage to build out their indoor application. An example of components of a fully developed application may include, but is not limited to, user interface, position fixes, routing, etc. An example of basic libraries, includes, but is not limited to, a basic positioning library with an indoor position application programming interface (API). It can be appreciated that the application library generation unit 160 may be configured to generate the pieces required for an indoor location application framework. In some embodiments, a user may publish this framework to other users for purposes of developing an indoor application for the specific structure. The application library generation unit 160 may receive map data from the metadata management module 150.

The applications generated by the application library generation unit 160 may provide added value for the user and reduce the time necessary for creating software. Some examples include, but are not limited to, routing functionality within the structure, POI search capability with text and voice, 3-D rendering of the map with support for 3-D turn-by-turn overlays, end-user input support, high-level map matching, and map changing based on the structure.

The utility application generation unit 170 is configured to generate a debug/admin application which may allow the user to collect, test, and/or debug their indoor application. The debug/admin application may be a generic application providing tools such as, but not limited to, access point scanning, fingerprinting, poor performance area identification, and other similar tools used in an indoor location deployment scenario. The debug/admin application may allow the user to test the location system of the structure without requiring the user to develop an application in order to do so. The utility application generation unit 170 may receive map data from the metadata management module 150.

The data generation and collection unit 180 is configured to generate a set of collection APIs which may allow the user to collect location information from end users of the indoor application. The collection APIs may be linked to a predefined back end infrastructure (not shown) provided by the system 100 or the user. In some embodiments, the collected location information may be sent from the data generation and collection unit 180 to the metadata management module 150 as a type of metadata which may be used by the system 100 to generate improved assistance data for the indoor application. The data generation and collection unit 180 may receive map data from the application library generation unit 160 and/or the utility application generation unit 170.

In some embodiments, a separate module (not shown) may exist configured to allow the user access to post-deployment improvement of his/her indoor application. The module may include the capability to analyze crowd-sourced location or structure information and reanalyze the generated positioning metadata in order to improve future location-based service performance for the indoor application. The improvements may include updating the indoor map for signal propagation automatically, fixing incorrect map features, identifying regions of interest within the structure, or even identifying security regions within the indoor map.

Figure 1B:
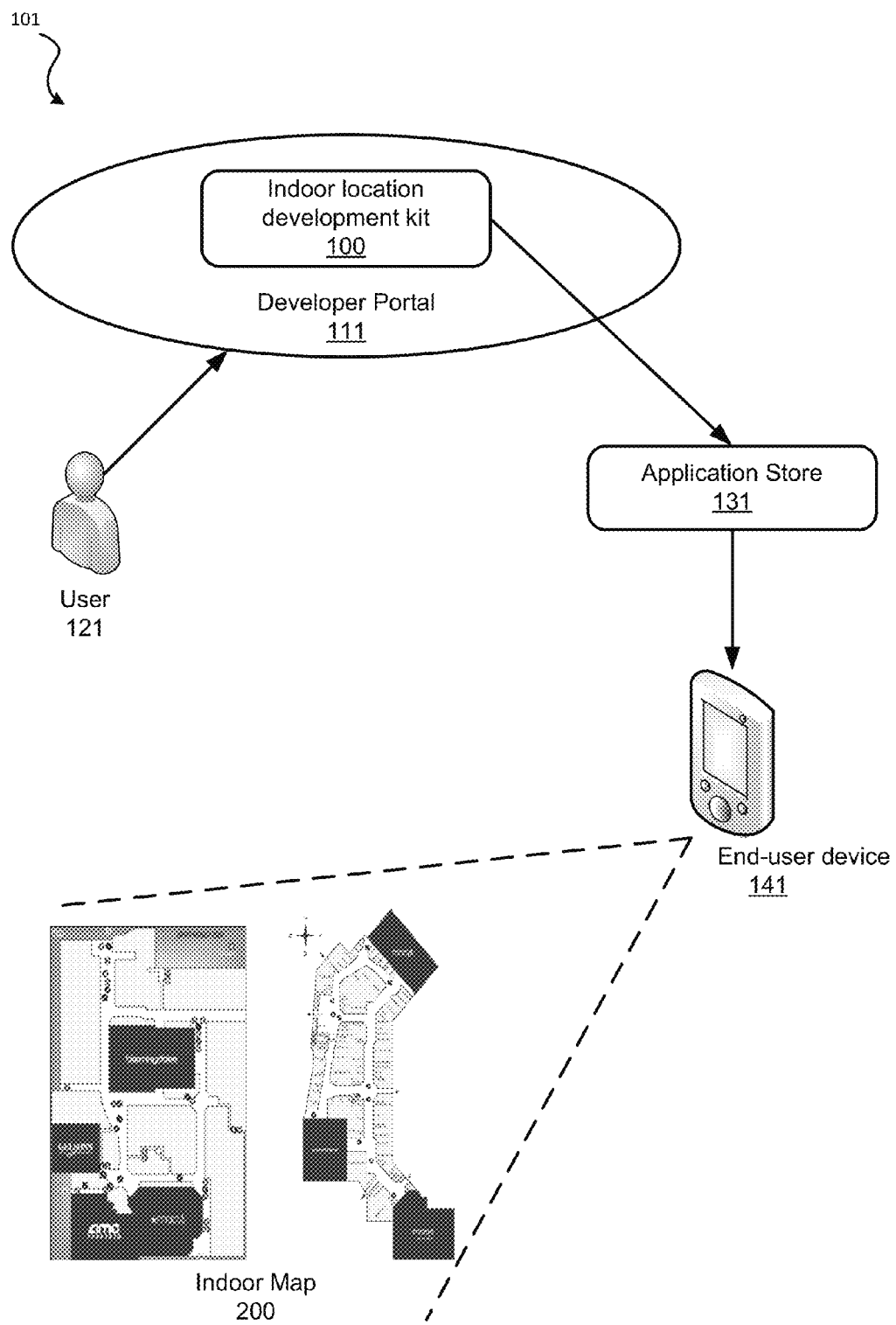
FIG. 1B illustrates a simplified block diagram of an application development and delivery system in accordance with some embodiments.

FIG. 1B illustrates a simplified block diagram of an application development and delivery system 101 in accordance with some embodiments. The application development and delivery system 101 includes a developer portal 111 and application store 131. In some embodiments, the application development and delivery system 101 may also include an end-user device 141.

The developer portal 111 is configured to allow access by a developer/user of an indoor application for purposes of uploading indoor digital map data 110 (FIG. 1A) for analysis and generation and appending of assistance data to the indoor map. The developer portal 111 may include the indoor location development kit (system) 100. The indoor location development kit (system) 100 may also be referred to as system 100 of FIG. 1A. The user 121 may access the developer portal 111 via the Internet. For example, the user 121 may point his/her web browser to http://dev.qualcomm.com to access the developer portal 111.

Upon accessing the developer portal 111, the user 121 may upload the digital map data 110 (FIG. 1A) and begin development using the indoor location development kit (system) 100. After using the indoor location development kit (system) 100 using the methods described in FIG. 1A, the user may generate assistance data for use with his/her indoor application. The assistance data and the indoor application may then be uploaded to an application store 131. In some embodiments, the assistance data may be generated after the user 121 uploads various pieces of information other than the digital map data 110. For example, the various pieces of information may include, but is not limited to, positions of Wi-Fi devices or other radio devices used as reference transmitters and/or points of interest within the structure.

The application store 131 is configured to provide a marketplace for applications to an end-user. The application store 131 may store indoor applications developed by the user 121. The application store 131 may also store the generated assistance data corresponding to the indoor application. In some embodiments, the assistance data may be stored in a server within the developer portal 111. The server may store indoor positioning assistance data for the application residing within the application store 131.

An end user may access the application store 131 and download/purchase the indoor application created by the user 121 to an end-user device 141. The generated assistance data may also be downloaded to the end-user device along with the indoor application. The end user may then use the indoor application along with the generated assistance data on the end-user device to view the indoor map 200 for purposes of positioning. In some embodiments, the application may include a pointer to the assistance data stored within the server residing within the developer portal. The application may download the assistance data locally from the server.

Figure 2A:
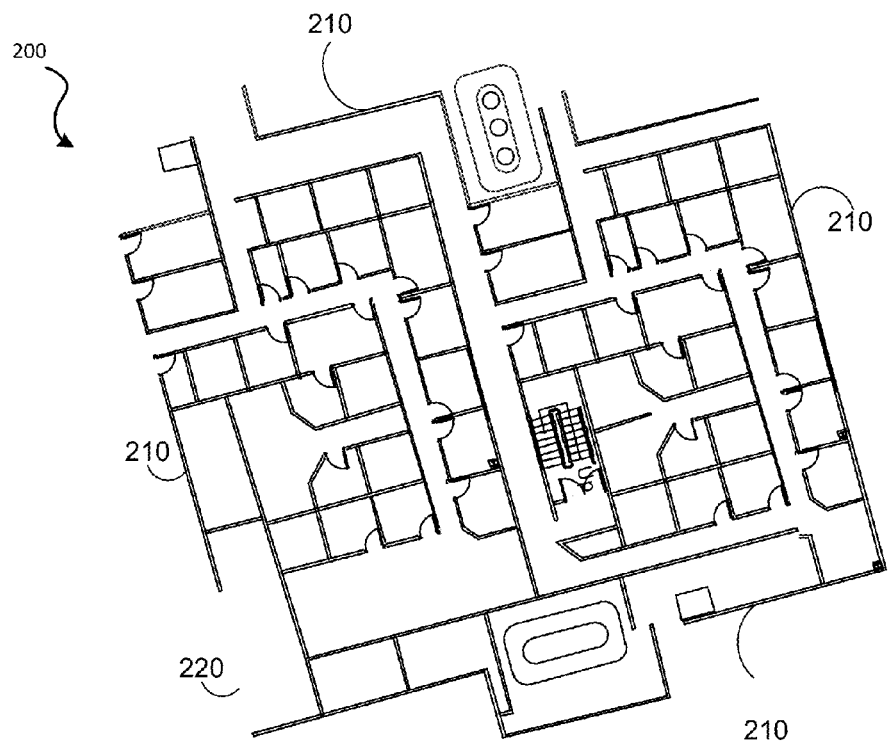
FIG. 2A illustrates an indoor map of a structure having a missing feature in accordance with some embodiments.

FIG. 2A illustrates an indoor map 200 of a structure having a missing feature in accordance with some embodiments. The indoor map 200 may be a visual representation of the digital map data 110 (FIG. 1A) that is input to the system 100 (FIG. 1A). As mentioned above, an indoor location system may heavily rely on the indoor map 200 of a structure. These indoor maps 200 may provide the basis for data input to the positioning engine and other location enabling services. The indoor map 200 may provide the outline of the structure including walls 210 within the structure. Any flaws in the map (e.g., missing walls & missing features) may greatly affect the positioning engine and also the end-user experience by providing failed routes within the structure.

An example of a missing wall 220 is illustrated in FIG. 2A. As shown, the missing wall 220 is misleading because it shows that the area of the missing wall 220 is outdoors. This may also be called a map bleed point. A map bleed point includes detection of points where the indoor area bleeds into the outdoor area unintentionally, as illustrated in FIG. 2. This tends to happen if, for example, features on the map are not aligning correctly and gaps are left between walls. The map bleed points may be detected by using a routing grid. The system 100 (FIG. 1A), particularly the map anomaly detection unit 130 (FIG. 1A), may determine which nodes are connected to the outdoors, but have characteristics of indoor nodes. The indoor node characteristic can be identified in a variety of ways. One of which uses a star topology collision feature method, in which a set number of lines are extended in all directions (at different angles) from the node in question and if a threshold based number of those lines intersect with map features (lines of arcs in the map) before reaching the borders of the map, it may be classified as an indoor point. Detection may also be made if it is known that a particular map is on a floor other than the first floor. For example, a flaw may be detected if exits to the outside from the second floor and above of the structure are detected. In some embodiments, map bleed may be detected by selecting a point outside the bounds of the map and running a path finding algorithm from the point to every other point on the map. Points that are not reachable may be classified as indoor points within the map.

Figure 2B:
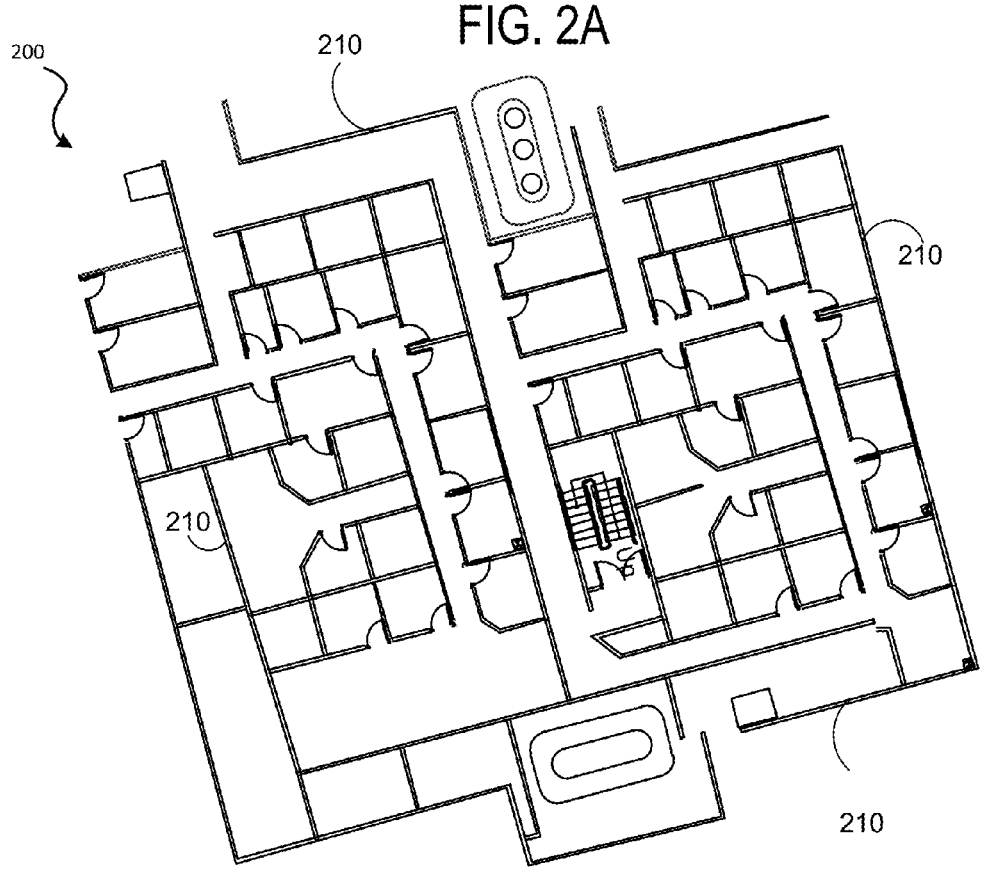
FIG. 2B illustrates an indoor map of a structure having a missing feature corrected in accordance with some embodiments.

Once the missing wall 220 is identified by the map anomaly detection unit 130 (FIG. 1A), the user may be notified of the flaw along with a suggested correction. The user may then use the map modification utility 140 (FIG. 1A) to incorporate the correction. In some embodiments, the map modification utility 140 (FIG. 1A) may automatically correct the missing wall 220 without any input from the user. FIG. 2B illustrates the indoor map 200 with the correction of the missing wall 220 (FIG. 2A).

In some embodiments, an assumption may be made that any given floor within a structure should be completely encapsulated. That is, no scenario should exist where there is a random opening to the outside. This assumption, in addition to the star collision feature mentioned above, may be used by the map anomaly detection unit 130 to detect flaws in the indoor map 200. In some embodiments, the map anomaly detection unit 130 may be able to detect extra walls that should not be present in the indoor map 200.

Figure 3A:
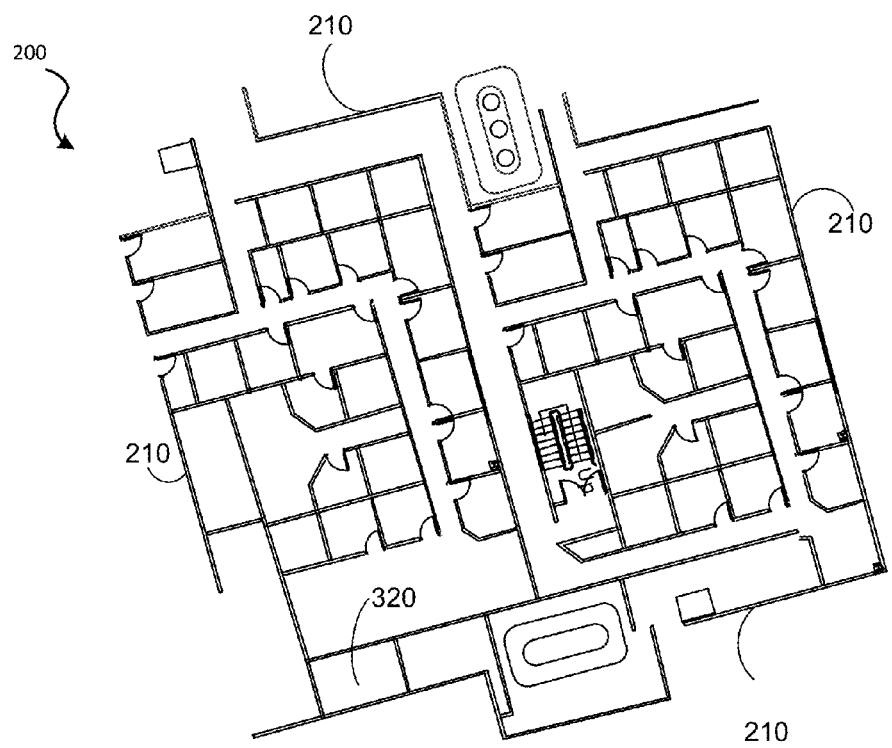
FIG. 3A illustrates an indoor map of a structure having an unreachable area in accordance with some embodiments.

FIG. 3A illustrates an indoor map 200 of a structure having an unreachable area 320 in accordance with some embodiments. Unreachable areas may be areas within the interior of the indoor map 200 which may not be physically accessible by an end-user. The unreachable area 320 may be detected by the map anomaly detection unit 130 (FIG. 1A) by overlaying a connectivity graph on the indoor map 200 and finding a set of known reachable points on the indoor map 200. Any set of points that are not reachable through the connectivity graph starting from the reachable set of points may be considered unreachable. It can be appreciated that the unreachable areas may be unreachable because they represent structural columns or other solid objects within the structure. Additionally, unreachable areas may be those that are physically reachable by a user but may be inaccurately defined as closed off within the map. The map anomaly detection unit 130 may flag these unreachable areas to the user by providing some type of visual cue, such as an outline around the unreachable area or coloring the unreachable area.

An example of an unreachable area 320 is illustrated in FIG. 3A. As shown, the unreachable area 320 may not be physically accessed by an end-user of the indoor application because it is surrounded by walls and there is no entry way into the unreachable area 320. The map anomaly detection unit 130 (FIG. 1A) may determine this flaw and allow the user to correct the flaw in the indoor map 200 using the map modification utility 140 (FIG. 1A).

Figure 3B:
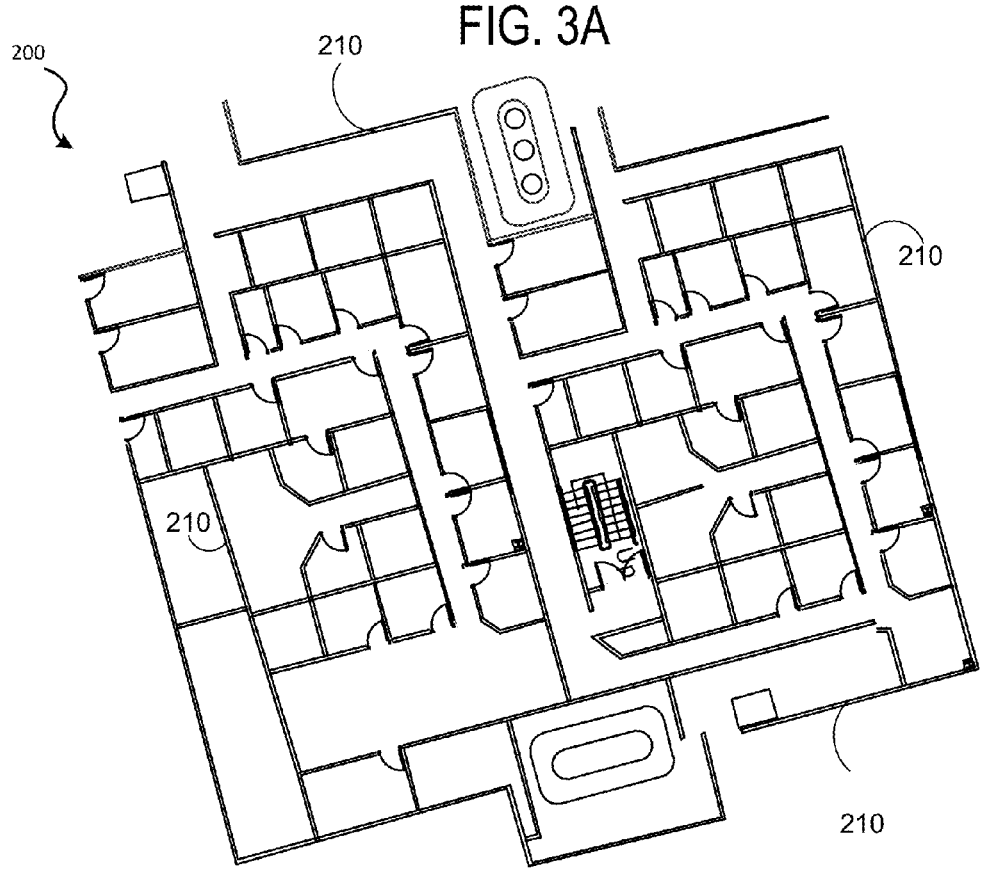
FIG. 3B illustrates an indoor map of a structure having an unreachable area corrected in accordance with some embodiments.

In some embodiments, the map anomaly detection unit 130 (FIG. 1A) may determine the unreachable area 320 flaw by using knowledge of other similar areas within the indoor map 200 which have entry ways. With knowledge of the similar areas, the map anomaly detection unit 130 (FIG. 1A) may determine that an entry way for the unreachable area 320 may have inadvertently been left out by the user. In some embodiments, the map modification utility 140 (FIG. 1A) may automatically correct the unreachable area 320. FIG. 3B illustrates the indoor map 200 with the correction of the unreachable area 320 (FIG. 3A).

In some embodiments, the map anomaly detection unit 130 (FIG. 1A) may determine the unreachable area 320 flaw by isolating layers of the indoor map 200. Often times, the digital map data 110 provided for the indoor map 200 may include layers for various objects within the structure. For example, furniture objects may be defined on their own layer within the indoor map 200. The map anomaly detection unit 130 (FIG. 1A) may analyze, for example, the door layer of the indoor map 200 to determine whether a door (entry way) into a room of the indoor map 200 is missing.

Figure 4:
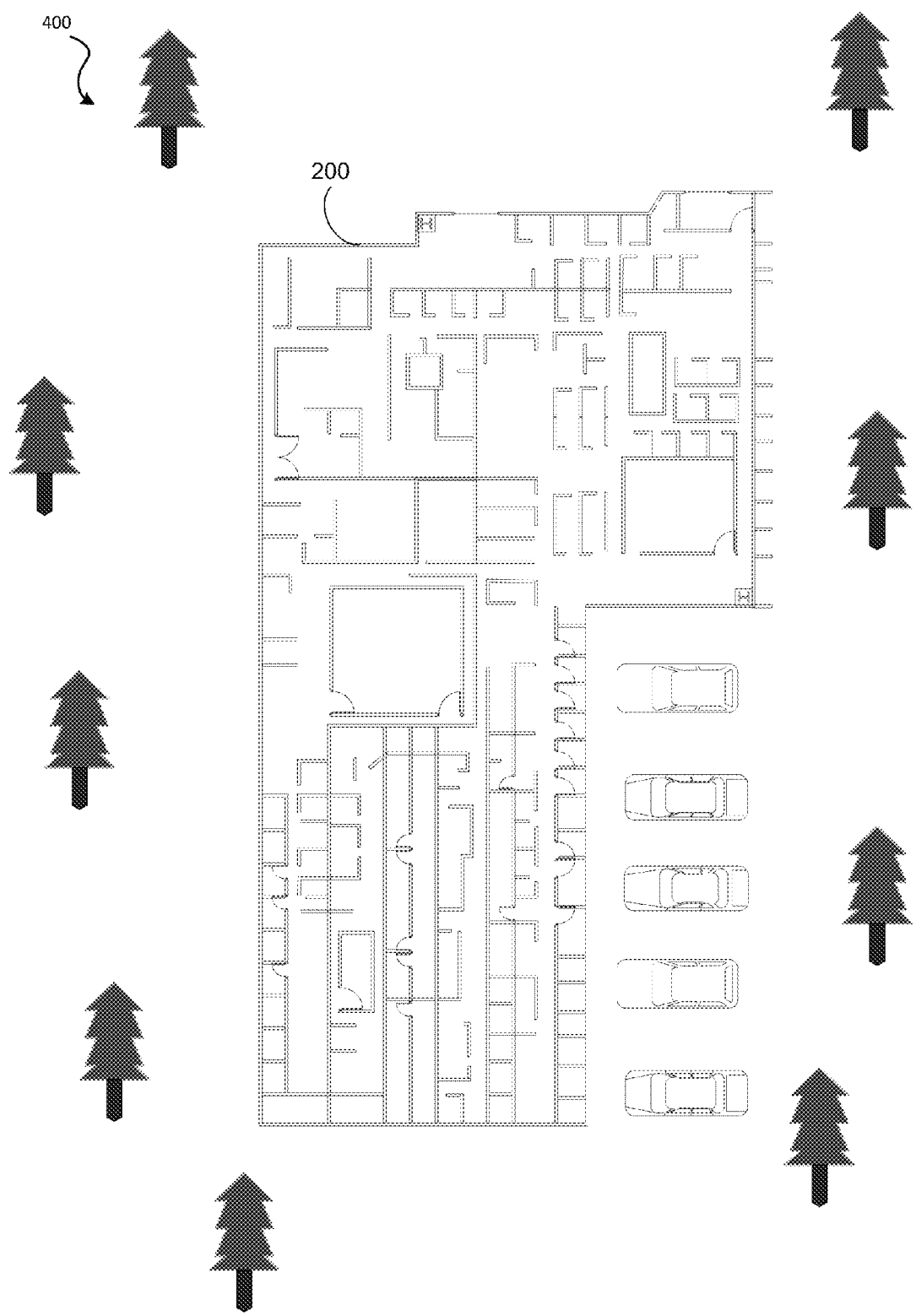
FIG. 4 illustrates an indoor map scaled and overlaid over an outdoor satellite map in accordance with some embodiments.

FIG. 4 illustrates an indoor map 200 scaled and overlaid over an outdoor satellite map 400 in accordance with some embodiments. In some instances, door frames in standard structures may have incremental fixed sizes. The map anomaly detection unit 130 (FIG. 1A) may detect doors and identify an expected scaled size to quickly identify skewed or warped feature sets within the indoor map 200. Additionally, by using an outdoor satellite map 400 as an auto-scaler, the map anomaly detection unit 130 (FIG. 1A) may overlay the indoor map 200 on an outdoor satellite map 400 to adjust the map scale. For example, selecting three or four pairs of points on the indoor map 200 that correspond to latitude and longitude on the outdoor satellite map 400 may be used to detect the correct scale as well. Furthermore, the user may have multiple maps including, but not limited to, a structural building map, an application presentation map, etc. The application presentation maps may be more appealing visually but may not be at the correct scale. The map anomaly detection unit 130 (FIG. 1A) may align the maps correctly so that any positioning information is calculated using the indoor map 200. It can be appreciated that scaling may only be performed for one of the maps while the other is adjusted accordingly. The information from these maps may be merged once they are scaled correctly. For example, the point of interest data from one map may be used to enhance another structural map without point of interest data once both of the maps have been scaled correctly.

In some embodiments, the outdoor satellite map 400 may be used as the frame of reference for the indoor map 200. The indoor map 200 may be scaled and oriented in reference to the outdoor satellite map 400. In turn, any other maps such as the ones mentioned above may use the indoor map 200 as the frame of reference for scaling and orientation.

Figure 5A:
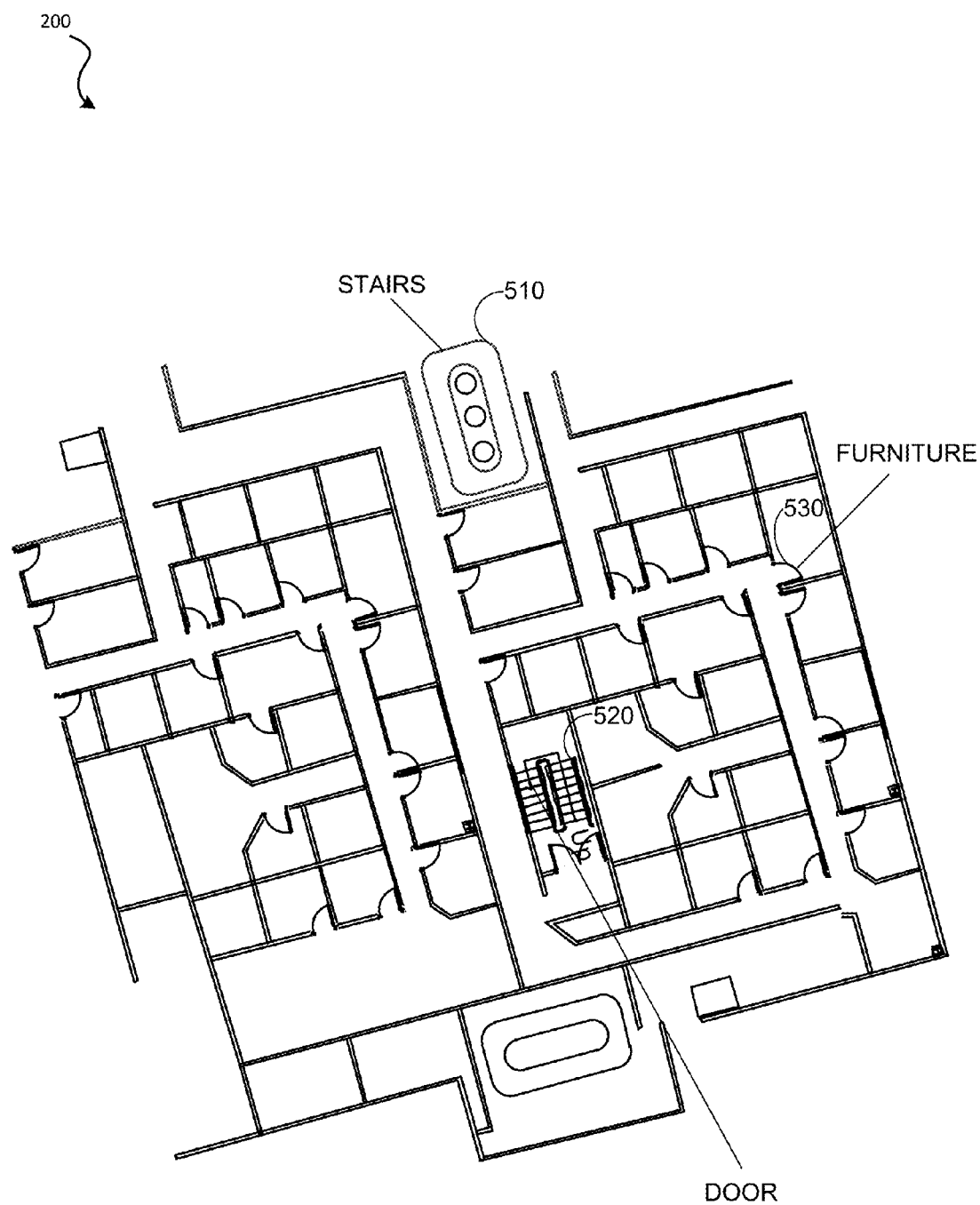
FIG. 5A illustrates an indoor map with mislabeled layers in accordance with some embodiments.

FIG. 5A illustrates an indoor map 200 with mislabeled layers in accordance with some embodiments. Properly labeled layers may be critical for the positioning engine, specifically for generating assistance data in regards to walls, doors, etc. Mislabeling layers on the indoor map 200 (e.g., walls mislabeled as doors, furniture labeled as walls) may result in poor performance of the positioning engine providing misguided information. Common objects such as furniture or stair cases may often be misclassified as a "wall"

feature or as other features within the indoor map 200. The map anomaly detection unit 130 (FIG. 1A) may identify mislabeled common furniture or other shapes using shape detection techniques and users may be informed to re-label the error using the map modification utility 140 (FIG. 1A). Many of these mistakes may be detected by the map anomaly detection unit 130 (FIG. 1A) by using a database of known shapes and using shape matching algorithms to identify those shapes in the indoor map 200 and verifying that they are labeled correctly. For example, if it is known what a stair well looks like than that shape may be searched for on the map, and if found, made sure that it is labeled as a stairwell or indoor portal. The user also be allowed to classify shapes themselves. The user-classified shapes may be added to a local and/or global storage database of shapes for use in the future. In some embodiments, mislabeled common shapes/layers may be relabeled correctly automatically by the map modification utility 140 (FIG. 1A).

An example of mislabeled layers is shown on the indoor map 200 in FIG. 5A. The furniture layer 510 is mislabeled as STAIRS, the stairway layer 520 is mislabeled as DOOR, and the doorway layer 530 is mislabeled as FURNITURE. These mislabeled layers of indoor map 200 may be detected by the map anomaly detection unit 130 (FIG. 1A). The user may be notified of these flaws and given an option to correct the flaws using the map modification utility 140 (FIG. 1A). In some embodiments, the map modification utility 140 (FIG. 1A) may correct the mislabeled layers automatically without any input from the user.

Figure 5B:
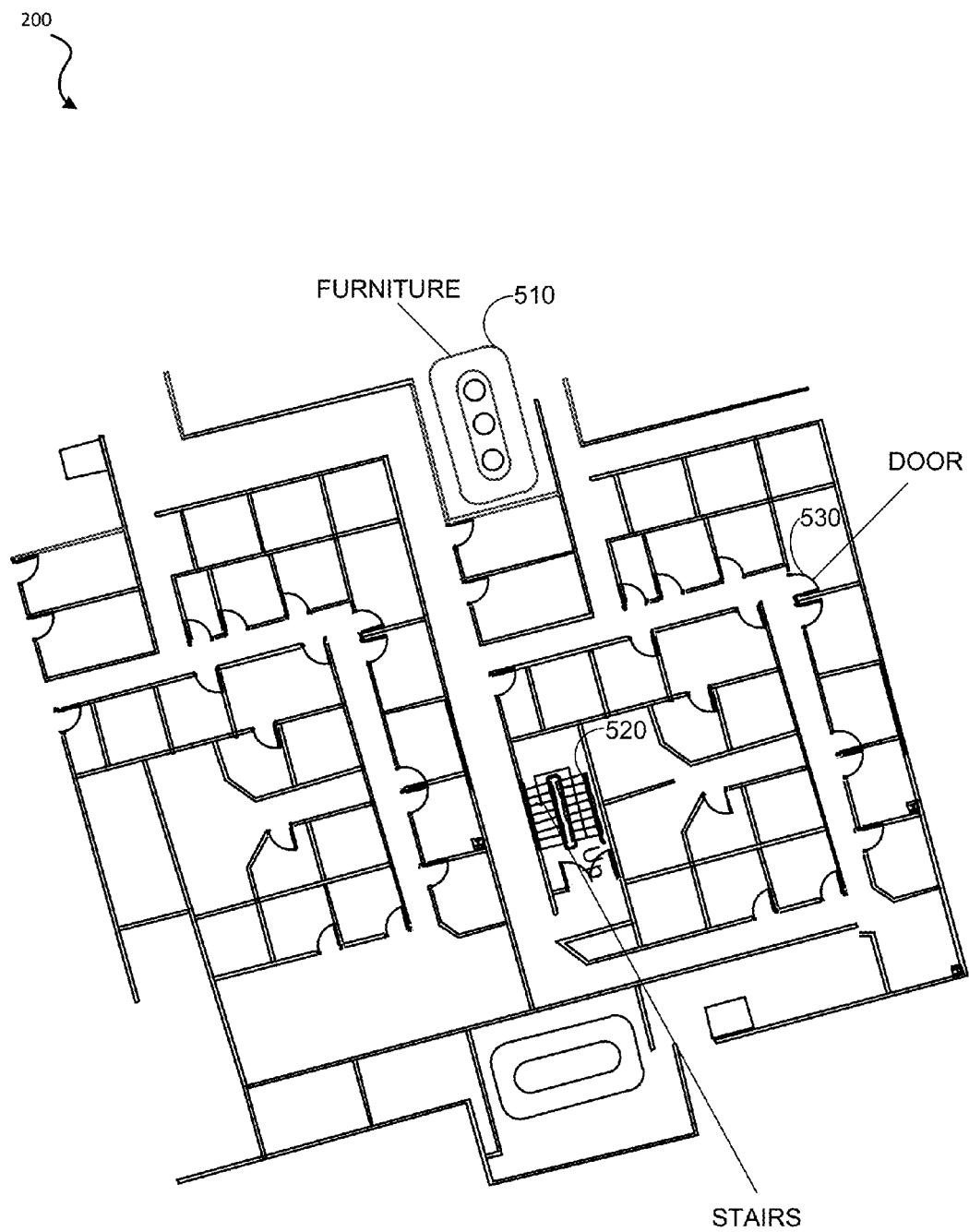
FIG. 5B illustrates an indoor map with mislabeled layers corrected in accordance with some embodiments.

FIG. 5B illustrates an indoor map 200 with mislabeled layers corrected in accordance with some embodiments. As shown in the figure, the furniture layer 510 is correctly labeled as FURNITURE, the stairway layer 520 is correctly labeled as STAIRS, and the doorway layer 530 is correctly labeled as DOOR. It can be appreciated that the corrected layers within indoor map 200 may have been corrected by the map modification utility 140 (FIG. 1A).

Figure 6A:
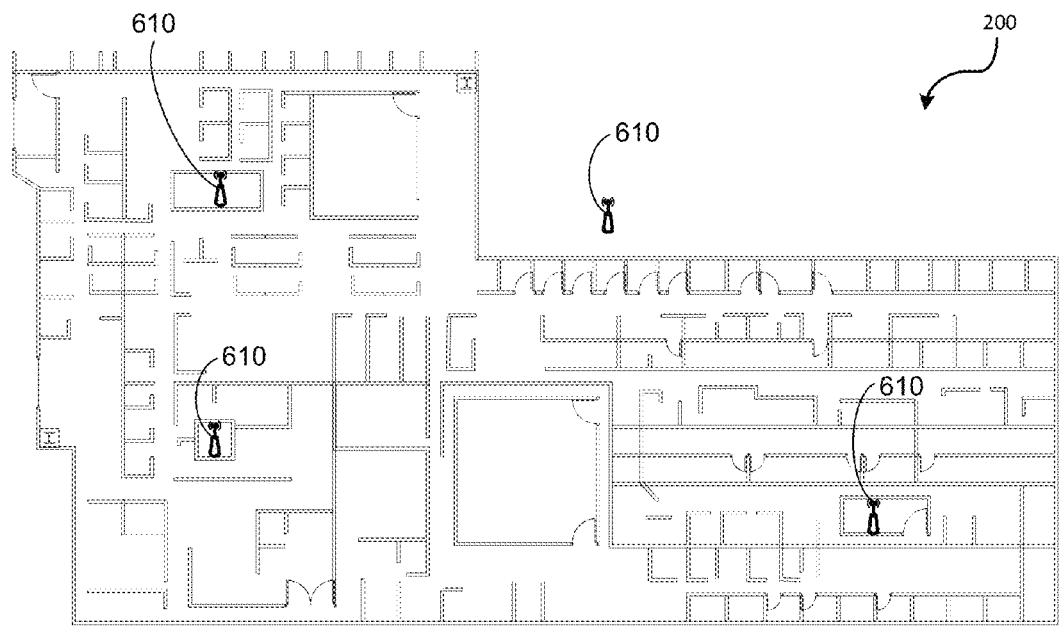
FIG. 6A illustrates an indoor map with incorrectly placed access points in accordance with some embodiments.

FIG. 6A illustrates an indoor map 200 with incorrectly placed access points (AP) 610 in accordance with some embodiments. Another critical component in indoor positioning performance is the placement of the access points 610 in a given location. The map anomaly detection unit 130 (FIG. 1A) may be configured to run access point 610 diagnostics in order to: locate unintentional incorrect placement of the APs (e.g., placing the AP off the map, in areas like elevator shafts or stair wells, etc.); and analyze the positioning coverage of the APs. By using horizontal dilution of precision (HDOP) analysis, which is well known in the art, areas within the indoor map 200 that have poor coverage performance may be highlighted to the user. The detected areas with poor coverage performance may either indicate a misplaced access point 610 or the likelihood that location based services may not be well suited in this area. In the case that the AP 610 is misplaced within the indoor map 200, the user may be presented with an option to correct the AP 610 placement using the map modification utility 140 (FIG. 1A). In some embodiments, the map modification utility 140 (FIG. 1A) may automatically correct placement of the APs 610 without any input from the user.

An example of incorrectly placed APs 610 is shown in FIG. 6A. Many of the APs 610 are placed within enclosed areas of the indoor map 200. Some APs 610 are even placed outside of the structure on indoor map 200. It is highly likely that these APs 610 may have been inadvertently placed as APs placed within enclosed areas and outside of the structure would likely result in poor performance. As mentioned above, map anomaly detection unit 130 (FIG. 1A) may run AP diagnostics on indoor map 200 to determine the unintentional placement of the APs 610. The map modification utility 140 (FIG. 1A) may automatically correct placement of the APs 610 or the user may provide input for the correction.

In determining whether the placement of the APs 610 was unintentional by the user, the map anomaly detection unit 130 (FIG. 1A) may make certain assumptions. These assumptions include, but are not limited to, that AP 610 placement is incorrect if the AP 610 is placed outside the structure, near stairwells, within elevator shafts, on balconies, or in any other uncommon areas within indoor map 200. AP 610 placement may also be determined to be unintentional if a number of APs 610 are clustered in a particular area within indoor map 200. Similarly, an AP 610 placed in an outlier region of the indoor map 200 may be determined to be unintentional. In some embodiments, the map anomaly detection unit 130 (FIG. 1A) may also suggest AP 610 placement in areas of the indoor map 200 where no AP 610 is located nearby, likely resulting in coverage issues in that area. These suggestions may be incorporated into indoor map 200 by the user using the map modification utility 140 (FIG. 1A). In some embodiments, potential problem areas with respect to AP 610 placement of indoor map 200 may be highlighted to the user using colors. For example, red may indicate no AP 610 coverage and green may indicate solid AP 610 coverage. Colors in between may indicate varying degrees of AP 610 coverage.

Figure 6B:
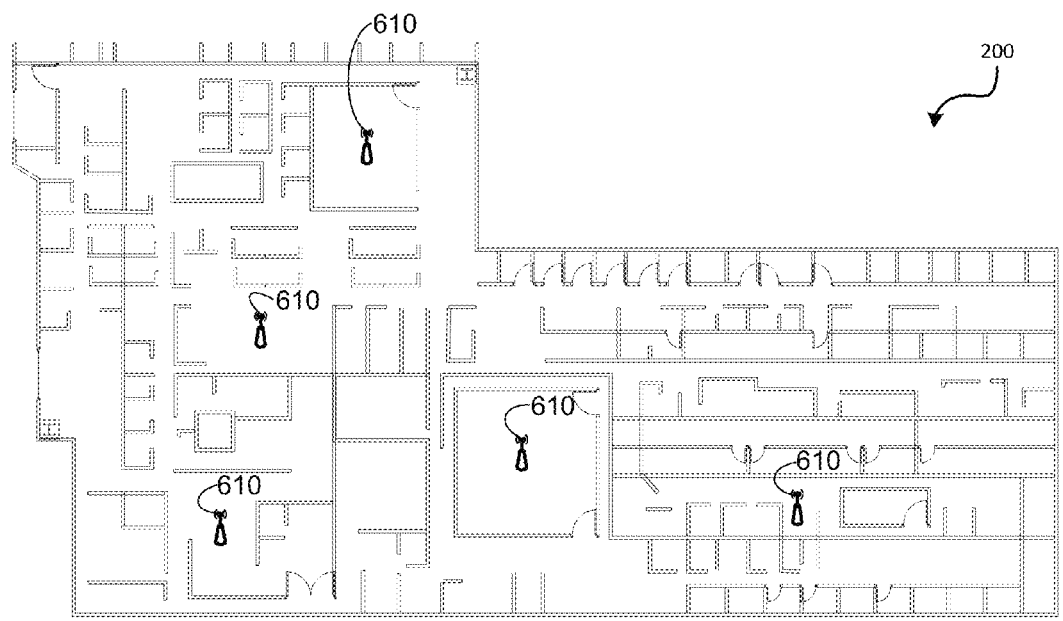
FIG. 6B illustrates an indoor map with correctly placed access points in accordance with some embodiments.

FIG. 6B illustrates an indoor map 200 with correctly placed access points 610 in accordance with some embodiments. The APs 610 have been placed in locations that are open and within larger rooms. By placing the APs 610 in locations such as these, the performance of the APs 610 may be expected to improve. In some embodiments, the APs 610 have a correlation to assistance data used by the positioning system. Thus, it is important to have the proper and actual locations of the APs 610 within the indoor map 200 to ensure reliable assistance data and proper function of the positioning system.

Figure 7:
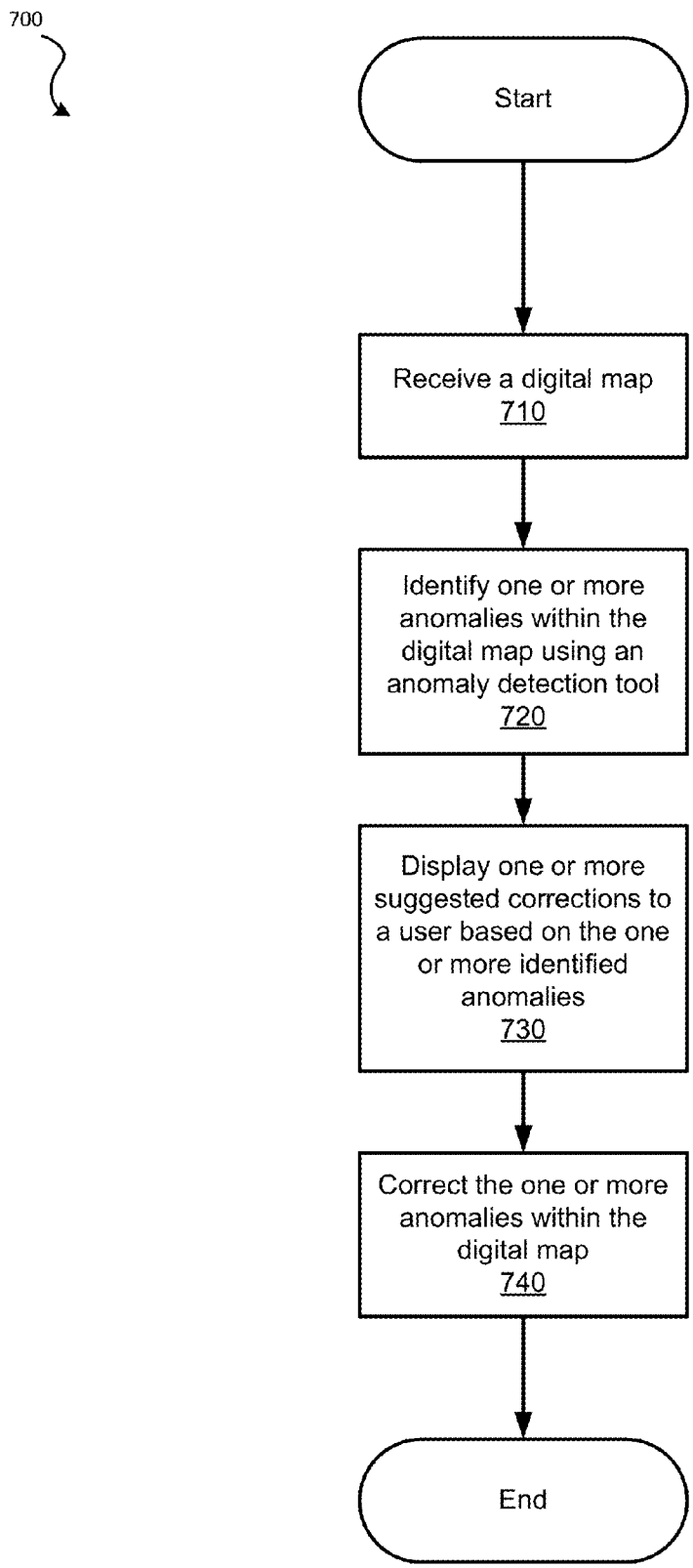
FIG. 7 is an exemplary flowchart illustrating a method for detecting anomalies within indoor map information in accordance with some embodiments.

FIG. 7 is an exemplary flowchart 700 illustrating a method for detecting anomalies within indoor map information in accordance with some embodiments. In block 710, a digital map is received. The digital map may be received from a user/developer of an indoor application. The digital map may be an indoor map describing the inside of a structure. For example, in FIG. 1A, the user may upload the digital map data to the system. If the digital map data is not in the appropriate format, the map generation unit may generate a map in the correct format based on the digital map data, prior to the map anomaly detection unit analyzing the map. Otherwise, if the digital map data is correctly formatted, the user may bypass the map generation unit and the map data may be directly received by the map anomaly detection unit.

In block 720, one or more anomalies within the digital map are identified using a software-based anomaly detection tool. The software-based anomaly detection tool may be able to identify various anomalies within the digital map including, but not limited to, missing features, unreachable areas, scaling issues, layer issues, and access point placement. For example, in FIG. 1A, the anomaly detection unit may take the received digital map data from the user/developer and perform analysis on the map data to determine any anomalies that exist. The map anomaly detection unit may use various methods for determining the anomalies within the map data.

In one example, in FIGS. 2A-2B, the map anomaly detection unit may use a star collision feature method in which a set number of lines are extended in all directions from a node in question to detect map "bleed" points and detect missing features within the map (e.g., a missing wall). If a threshold based number of lines intersect with map features prior to reaching the borders of the map, they may be classified as an indoor point. Detection of missing features may also be made if it is known, with respect to a particular map, if the node in question is on a floor other than first floor. If exits are discovered to the outside area of the map on the second floor and above, a potential flaw may be identified.

In another example, in FIGS. 3A-3B, the map anomaly detection unit may detect unreachable areas within the map. Unreachable areas are areas within the interior of the map which may not be physically accessible by an end-user. The unreachable areas within the map may be discovered by overlaying a connectivity graph of the map and determining a set of known reachable points on the map. Any set of points that are not reachable through the connectivity graph starting from the reachable set of points may be considered unreachable. The unreachable areas may be tagged and highlighted by the map anomaly detection unit.

In yet another example, in FIG. 4, the map anomaly detection unit may be able to detect scaling issues within the map. Since most door frames within standard buildings have incremental fixed sizes, door detection may be used to identify an expected scaled size to quickly identify skewed or warped feature sets. By using satellite maps as an auto-scaler, the indoor map may be overlaid on the satellite map to detect any scaling issues.

In a further example, in FIGS. 5A-5B, the map anomaly detection unit may detect mislabeled layers within the map. Mislabeling layers within the map may result in poor performance of the positioning engine. In any given map, it may be critical to correctly label features/layers of the map. Common objects such as furniture or stair cases may often be mislabeled as wall features, etc. These flaws may be detected using shape detection techniques. Specifically, by using a database of known shapes and using shape matching algorithms to identify the shapes within the map, the shapes' labels may be verified.

In an additional example, in FIGS. 6A-6B, the map anomaly detection unit may detect flaws with access point placement within the map. Access point placement in a given structure may be a critical component in positioning performance. The map detection anomaly unit may detect unintentional or incorrect placement of access points, such as placing an access point off the map or in locations that do not seem logical (e.g., areas such as elevators, shafts, or stair wells). Using an HDOP analysis, areas within the map that are identified as possibly performing poorly may be highlighted.

In block 730, one or more suggested corrections are displayed to the user, based on the one or more identified anomalies. For example, in FIG. 1A, after identifying any anomalies within the map using the map anomaly detection unit, the system may display the identified anomalies to the user via a user interface. The user interface may highlight, mark circle, box, list, or otherwise identify the anomalies to the user in any other fashion.

In block 740, the one or more anomalies within the digital map may be corrected. For example, in FIG. 1A, after identifying the anomalies using the map anomaly detection unit, the anomalies may be presented to the user and the user may interact with the map modification utility to make any appropriate corrections. The map modification utility may simply point out the flaws in the map, or may also provide suggested corrections to the user. In some embodiments, the map modification utility may also automatically correct the flaws within the map without any input from the user.

Figure 8:
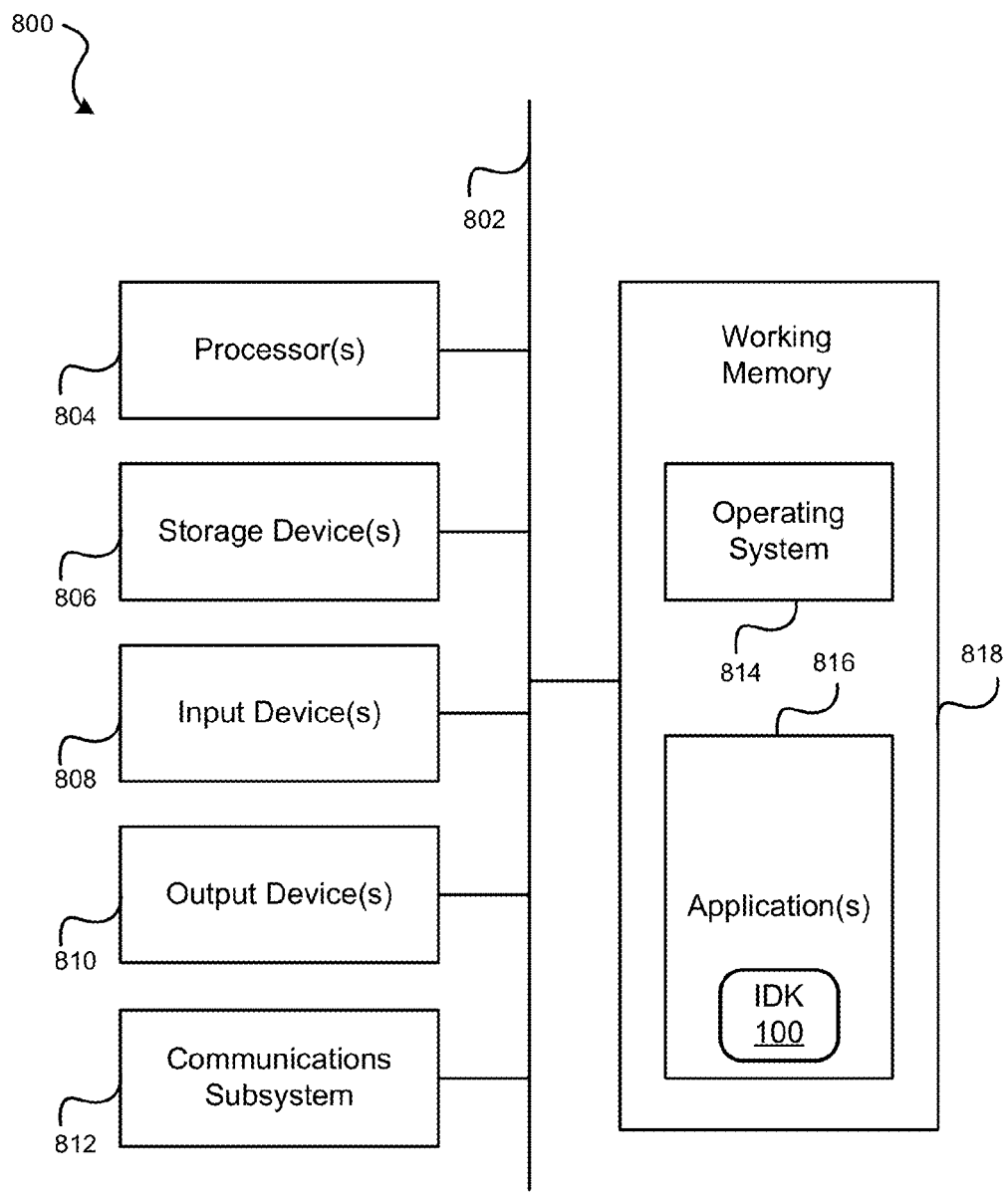
FIG. 8 illustrates an example of a computing system in which one or more embodiments may be implemented.

Having described multiple aspects of detecting anomalies within indoor map information, an example of a computing system in which various aspects of the disclosure may be implemented will now be described with respect to FIG. 8. According to one or more aspects, a computer system as illustrated in FIG. 8 may be incorporated as part of a computing device, which may implement, perform, and/or execute any and/or all of the features, methods, and/or method steps described herein. For example, computer system 800 may represent some of the components of a hand-held device. A hand-held device may be any computing device with an input sensory unit, such as a wireless receiver or modem. Examples of a hand-held device include but are not limited to video game consoles, tablets, smart phones, televisions, and mobile devices or mobile stations. In some embodiments, the computer system 800 is configured to implement any of the methods described above. FIG. 8 provides a schematic illustration of one embodiment of a computer system 800 that can perform the methods provided by various other embodiments, as described herein, and/or can function as the host computer system, a remote kiosk/terminal, a point-of-sale device, a mobile device, a set-top box, and/or a computer device. FIG. 8 is meant only to provide a generalized illustration of various components, any and/or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 802 (or may otherwise be in communication, as appropriate). The hardware elements may include one or more processors 804, including without limitation one or more general-purpose processors and/or one or more special-purpose processors (such as digital signal processing chips, graphics acceleration processors, and/or the like); one or more input devices 808, which can include without limitation a camera, wireless receivers, wireless sensors, a mouse, a keyboard and/or the like; and one or more output devices 810, which can include without limitation a display unit, a printer and/or the like. In some embodiments, the one or more processors 804 may be configured to perform a subset or all of the functions described above with respect to FIG. 7. The processor 804 may comprise a general processor and/or and application processor, for example.

The computer system 800 may further include (and/or be in communication with) one or more non-transitory storage devices 806, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 800 might also include a communications subsystem 812, which can include without limitation a modem, a network card (wireless or wired), an infrared communication device, a wireless communication device and/or chipset (such as a Bluetooth® device, an 802.11 device, a Wi-Fi device, a WiMax device, cellular communication facilities, etc.), and/or the like. The communications subsystem 812 may permit data to be exchanged with a network, other computer systems, and/or any other devices described herein. In many embodiments, the computer system 800 will further comprise a non-transitory working memory 818, which can include a RAM or ROM device, as described above.

The computer system 800 also can comprise software elements, shown as being currently located within the working memory 818, including an operating system 814, device drivers, executable libraries, and/or other code, such as one or more application programs 816, which may comprise computer programs provided by various embodiments, and/or may be designed to implement methods, and/or configure systems, provided by other embodiments, as described herein. In some embodiments, the indoor location development kit (system) 100 may exist as one of the application programs 816 stored within working memory 818. Merely by way of example, one or more procedures described with respect to the method(s) discussed above, for example as described with respect to FIG. 7, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 806 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 800) to perform methods in accordance with the disclosure. For example, some or all of the procedures of the described methods may be performed by the computer system 800 in response to processor 804 executing one or more sequences of one or more instructions (which might be incorporated into the operating system 814 and/or other code, such as an application program 816) contained in the working memory 818. Such instructions may be read into the working memory 818 from another computer-readable medium, such as one or more of the storage device(s) 806. Merely by way of example, execution of the sequences of instructions contained in the working memory 818 might cause the processor(s) 804 to perform one or more procedures of the methods described herein, for example methods described with respect to FIG. 7.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor (s) 804 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 806. Volatile media include, without limitation, dynamic memory, such as the working memory 818. Transmission media include, without limitation, coaxial cables, copper wire and fiber optics, including the wires that comprise the bus 802, as well as the various components of the communications subsystem 812 (and/or the media by which the communications subsystem 812 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments.

The communications subsystem 812 (and/or components thereof) generally will receive the signals, and the bus 802 then might carry the signals (and/or the data, instructions, etc. carried by the signals) to the working memory 818, from which the processor(s) 804 retrieves and executes the instructions. The instructions received by the working memory 818 may optionally be stored on a non-transitory storage device 806 either before or after execution by the processor(s) 804. Memory 818 may contain at least one database according to any of the databases and methods described herein. Memory 818 may thus store any of the values discussed in any of the present disclosures, including FIG. 7 and related descriptions.

The methods described in FIG. 7 may be implemented by various blocks in FIG. 8. For example, processor 804 may be configured to perform any of the functions of blocks in flowchart 700. Storage device 806 may be configured to store an intermediate result, such as a globally unique attribute or locally unique attribute discussed within any of blocks mentioned herein. Storage device 806 may also contain a database consistent with any of the present disclosures. The memory 818 may similarly be configured to record signals, representation of signals, or database values necessary to perform any of the functions described in any of the blocks mentioned herein. Results that may need to be stored in a temporary or volatile memory, such as RAM, may also be included in memory 818, and may include any intermediate result similar to what may be stored in storage device 806. Input device 808 may be configured to receive wireless signals from satellites and/or base stations according to the present disclosures described herein. Output device 810 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the embodiments. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various embodiments have been described. These and other examples are within the scope of the following claims.

What is claimed is:

1. A method comprising:
  receiving a digital map;
  identifying one or more anomalies within the digital map using a software-based anomaly detection tool;
  wherein the software-based anomaly detection tool identifies the one or more anomalies within the digital map based on:
    detection of one or more points where an indoor area of the digital map leads to an outdoor area of the digital map, or
    one or more unreachable areas within an indoor area of the digital map;
  displaying one or more suggested corrections to a user based on the one or more identified anomalies; and
  correcting the one or more identified anomalies within the digital map.

2. The method of claim 1 further comprising generating assistance data based on the correcting.

3. The method of claim 2 further comprising appending the assistance data to the digital map.

4. The method of claim 1, wherein the software-based anomaly detection tool identifies the one or more anomalies within the digital map based on overlaying an indoor map of the digital map over an outdoor map of the digital map.

5. The method of claim 1, wherein the software-based anomaly detection tool identifies the one or more anomalies within the digital map based on using a database of known shapes and using shape matching algorithms to verify correct labeling of the known shapes in the digital map.

6. The method of claim 1, wherein the software-based anomaly detection tool identifies the one or more anomalies within the digital map based on locating incorrect placement of one or more access points within the digital map.

7. The method of claim 1, wherein the digital map is configured for use with an application on a mobile device.

8. An apparatus comprising:
  a processor;
  a memory coupled to the processor, the memory comprising a software development kit (SDK) configured to:
  receive a digital map;
  identify one or more anomalies within the digital map using a software-based anomaly detection tool;
  wherein the software-based anomaly detection tool identifies the one or more anomalies within the digital map based on:
    detection of one or more points where an indoor area of the digital map leads to an outdoor area of the digital map, or
    one or more unreachable areas within an indoor area of the digital map;
  display one or more suggested corrections to a user based on the one or more identified anomalies; and
  correct the one or more identified anomalies within the digital map.

9. The apparatus of claim 8 further comprising generating assistance data based on the correcting.

10. The apparatus of claim 9 further comprising appending the assistance data to the digital map.

11. The apparatus of claim 8, wherein the software-based anomaly detection tool identifies the one or more anomalies within the digital map based on overlaying an indoor map of the digital map over an outdoor map of the digital map.

12. The apparatus of claim 8, wherein the software-based anomaly detection tool identifies the one or more anomalies within the digital map based on using a database of known shapes and using shape matching algorithms to verify correct labeling of the known shapes in the digital map.

13. The apparatus of claim 8, wherein the software-based anomaly detection tool identifies the one or more anomalies within the digital map based on locating incorrect placement of one or more access points within the digital map.

14. The apparatus of claim 8, wherein the digital map is configured for use with an application on a mobile device.

15. An apparatus comprising:
  means for receiving a digital map;
  means for identifying one or more anomalies within the digital map using a software-based anomaly detection tool;

wherein the software-based anomaly detection tool identifies the one or more anomalies within the digital map based on:
   detection of one or more points where an indoor area of the digital map leads to an outdoor area of the digital map, or
one or more unreachable areas within an indoor area of the digital map;
means for displaying one or more suggested corrections to a user based on the one or more identified anomalies; and
means for correcting the one or more identified anomalies within the digital map.

16. The apparatus of claim 15, wherein the software-based anomaly detection tool identifies the one or more anomalies within the digital map based on overlaying an indoor map of the digital map over an outdoor map of the digital map.

17. The apparatus of claim 15, wherein the software-based anomaly detection tool identifies the one or more anomalies within the digital map based on using a database of known shapes and using shape matching algorithms to verify correct labeling of the known shapes in the digital map.

18. The apparatus of claim 15, wherein the software-based anomaly detection tool identifies the one or more anomalies within the digital map based on locating incorrect placement of one or more access points within the digital map.

19. A non-transitory computer readable medium residing on a processor-readable medium and comprising processor-readable instructions configured to cause a processor to:
   receive a digital map;
   identify one or more anomalies within the digital map using a software-based anomaly detection tool;
   wherein the software-based anomaly detection tool identifies the one or more anomalies within the digital map based on:
      detection of one or more points where an indoor area of the digital map leads to an outdoor area of the digital map, or
      on one or more unreachable areas within an indoor area of the digital map;
   display one or more suggested corrections to a user based on the one or more identified anomalies; and
   correct the one or more identified anomalies within the digital map.

20. The non-transitory computer readable medium of claim 19, wherein the software-based anomaly detection tool identifies the one or more anomalies within the digital map based on overlaying an indoor map of the digital map over an outdoor map of the digital map.

21. The non-transitory computer readable medium of claim 19, wherein the software-based anomaly detection tool identifies the one or more anomalies within the digital map based on using a database of known shapes and using shape matching algorithms to verify correct labeling of the known shapes in the digital map.

22. The non-transitory computer readable medium of claim 19, wherein the software-based anomaly detection tool identifies the one or more anomalies within the digital map based on locating incorrect placement of one or more access points within the digital map.

* * * * *